United States Patent [19]

Döhring

[11] Patent Number: 5,584,270
[45] Date of Patent: Dec. 17, 1996

[54] INTAKE PIPE FOR AN INTERNAL COMBUSTION ENGINE

[75] Inventor: Klaus Döhring, München, Germany

[73] Assignee: Firma Carl Freudenberg, Weinheim, Germany

[21] Appl. No.: 238,289

[22] Filed: May 5, 1994

[30] Foreign Application Priority Data

May 5, 1993 [DE] Germany .................... 43 14 809.3

[51] Int. Cl.⁶ .................... F02D 9/02; F16K 15/00
[52] U.S. Cl. .................... 123/184.54; 123/184.56
[58] Field of Search .................... 123/184.53, 184.54, 123/184.56, 184.61; 137/536, 542, 543

[56] References Cited

U.S. PATENT DOCUMENTS

| | | | |
|---|---|---|---|
| 1,379,327 | 5/1921 | Bachle | 123/184.56 |
| 2,170,478 | 8/1939 | Long et al. | 137/542 |
| 2,809,660 | 10/1957 | Becker | 137/536 |
| 2,909,192 | 10/1959 | Dobrick | 137/542 |
| 4,271,862 | 6/1981 | Snoek | 137/542 |
| 4,488,566 | 12/1984 | Hicks | 137/542 |
| 4,813,452 | 3/1989 | Smith | 137/542 |
| 4,930,539 | 6/1990 | Van Rooy | 137/542 |
| 5,216,985 | 6/1993 | Brummer et al. | 123/184.56 |

Primary Examiner—Marguerite McMahon
Attorney, Agent, or Firm—Kenyon & Kenyon

[57] ABSTRACT

An intake a pipe of an internal combustion engine is disclosed. The intake pipe has a dimensionally stable intake pipe body with a passthrough opening, and a positioning element arranged in the passthrough opening to change the area of flow cross section. The positioning element is constructed of a nonreturn valve opening only toward the internal combustion engine, the nonreturn valve comprising a sealing element and a sealing seat which can move relative to one another and which can be brought, as required, into engagement with one another to close off the passthrough opening.

9 Claims, 5 Drawing Sheets

INTAKE PIPE FOR AN INTERNAL COMBUSTION ENGINE

BACKGROUND OF THE INVENTION

This invention relates generally to an intake pipe for an internal combustion engine of the type having a dimensionally stable intake pipe body with a passthrough opening and a positioning element arranged in the passthrough opening to change the flow cross section.

Intake pipes of this kind are generally known; the positioning element typically consists of a throttle valve that is arranged, rotatably about its axis, within the passthrough opening. However, valve overlap in the internal combustion engine generates a pulsating gas flow in the intake pipe, which leads to undesirable backflow of the air/fuel mixture into the intake pipe. The gas flow that flows back out of the combustion chamber into the intake pipe due to valve overlap reduces the output of the internal combustion engine.

There remains a need for the further development of an intake pipe of the previously known type such that the positioning element can be used to control the air/fuel mixture through the passthrough opening of the intake pipe body in a manner that reliably prevents backflow of gases from the combustion chamber of the internal combustion engine into the intake pipe.

SUMMARY OF THE INVENTION

The present invention provides a dimensionally stable intake pipe having a pass-through opening and connected to an internal combustion engine to have a positioning element having a nonreturn valve that opens only toward the internal combustion engine. The nonreturn valve comprises a sealing element and a sealing seat which can move relative to one another and can be brought, as required, into engagement with one another to close off the passthrough opening.

Pulsating gas flows result from valve overlap in the internal combustion engine; detrimental backflow is most apt to appear at low engine speeds due to the relatively low gas velocity. An advantage in this connection is that the nonreturn valve which replaces the conventional throttle valve can be used to prevent backflow of gases out of the combustion chamber of the internal combustion engine into the intake pipe. In addition, the gas volume flow through the intake pipe can be controlled with the nonreturn valve. Because the nonreturn valve is used to control the gas volume flow into the combustion chambers, and can further be used to reliably prevent backflow into the intake pipe, pressure charging effects occur at low engine speeds, leading to a relatively increased output for the internal combustion engine in this speed range. Moreover, the nonreturn valve is easy to manufacture in terms of economy and production engineering. The sealing seat of the nonreturn valve can constitute a component of the intake pipe body, which helps minimize the number of parts of the intake pipe.

According to a first embodiment, the sealing element can be supported on a compression spring acting in the direction of the sealing seat, and can be actuated by differential pressure across the sides of the valve. The sealing element is pushed by the spring bias toward the valve seat; it is moved toward the open position as a function of the gas force applied by the air/fuel flow. In an embodiment of this kind, the flow cross section through the passthrough opening depends on the differential pressure across the valve and the spring force acting on the sealing element.

Additionally or alternatively, the sealing element can be actuated by an actuation device. This is particularly advantageous when it is desirable for the passthrough opening to be completely closed or held completely open, regardless of the pressure conditions in the intake pipe. The actuation device can interact with the spring in such a way that the spring force is variable. To completely suppress the gas volume flow through the passthrough opening of the intake pipe body, the spring force is set so high that the force exerted by the gas flow or the differential pressure is not sufficient to lift the sealing element off the sealing seat. The nonreturn valve then prevents flow in both directions, and is completely closed. On the other hand, where it is desired to hold the passthrough opening completely open, the sealing element is moved by the actuation device so far away from the valve seat that it can be held completely open regardless of gas forces. This state can be desirable when the internal combustion engine is operating at high speed, when backflow does not constitute a problem due to the high gas velocities, but maximum gas volume flow is desirable for optimum combustion chamber filling.

The sealing element can be substantially conical in shape, and can possess a cross section which expands in the opening direction. This shape is favorable for the configuration of the nonreturn valve because the sealing element presents only a relatively low flow resistance to the gas flow in the desired flow direction, but in the opposite flow direction can be brought into engagement with the sealing seat and closes off the passthrough opening. Moreover, the streamlined shape prevents the formation of turbulence in the gas flow.

According to one advantageous embodiment, the sealing element can be made of a polymer material. It is advantageous in this context that the mass of the sealing element, and therefore its inertia, be very low, and that it can be caused to moved even by small changes in differential pressure. The wall thickness of the polymeric sealing element can be between 0.3 mm and 0.6 mm, and may preferably lie between 0.4 mm and 0.5 mm. It is also possible for the sealing element to be made of spring steel. In this case, the wall thickness of the sealing element can be between 0.15 mm and 0.3 mm (preferably 0.2 mm to 0.25 mm). When spring steel is used as the material of the sealing element, provision is made, in the interest of enhanced sealing, for the sealing seat to be made of polymer material or at least be provided with a coating of that nature.

The sealing element can be fastened to at least one spoke-shaped web extending from the intake pipe body substantially radially into the passthrough opening. The web provides guidance for the sealing element in the direction of movement, and thus produces a precise association of sealing element and sealing seat with one another. The web can have a streamlined profile so as to present as little resistance as possible to the gas flowing toward the internal combustion engine. The web and the intake pipe body can both be made of polymer material, and can be joined together, for example, by ultrasonic welding.

The actuation device, where one is employed, can be a reciprocating element, capable of moving back and forth in the axial direction with respect to the sealing seat, that is surrounded and guided by the web; the reciprocating element and sealing element are associated with one another by means of a spring element in a lossproof and resilient manner, and the reciprocating element is connected to a positioning device in a signal-carrying manner. The spring force can be varied by means of the reciprocating movement of the reciprocating element, which supports the spring.

When the reciprocating element is at its maximum stroke toward the sealing seat, the sealing element is brought into engagement therewith and the passthrough opening through the intake pipe body is closed off. When the reciprocating element is at its maximum stroke in the opposite direction, the sealing element is moved so far away from the sealing seat that it can no longer close off the intake pipe body, so that the sealing seat is held completely open. To accommodate this feature, the spring is of a type that can transfer both tensile and compressive forces.

The advantage of using an actuation device to open and close the sealing element lies in the fact that undesired local throttling of the flow can thereby be avoided. If the sealing element can be moved only by differential pressure, local throttling at constant pressure conditions within the intake pipe can occur, leading to a reduction in the volume flow and to a relative reduction in filling of the combustion chambers of the internal combustion engine. Local throttling and reduced volume flow can be avoided by use of a triggerable nonreturn valve. The differential pressure of the flow is then no longer primarily responsible for the movement of the valve body; instead, additional energy for acceleration and movement of the valve is supplied from outside the fluid flow (i.e., by the actuator). The valve acceleration energy is timed in such a way that movement of the sealing element just precedes the buildup of differential pressure. Ideally, the movement of the sealing element then matches the gas flow in precisely analogous fashion, but entirely without reliance upon the differential pressure and therefore with no unintended throttling by the valve body. Combinations of actuation of the sealing element by differential pressure and actuation of the sealing element by an actuation device are also possible. When the volume flow toward the internal combustion engine is comparatively low, the sealing element can initially be moved by the actuation device. Under partial load, for example, when throttling is desirable, the sealing element can move solely under the action of differential pressure. At full load, when minimum disturbance of the gas flow is desired, appropriate active triggering of the sealing element is possible.

The positioning device may take any of several different forms. For example, a servomotor may be employed, which is well suited to providing a stepless and precise actuation of the sealing element.

According to another embodiment, the actuation device is an electromagnet whose coil is joined in relatively immovable fashion to the web, and whose armature is rigidly joined to the sealing element, the armature and sealing element being associated in a lossproof manner with one another by means of a spring element which is resilient in the axial direction. The timing frequency for opening and closing the nonreturn valve can be provided via the electrical triggerability of the magnet.

The electromagnet can be connected to a control unit in a signal-carrying manner. The control unit can be for example, the electronic engine management system of the internal combustion engine. A plurality of signals, for example speed, gas pedal position, etc. may thereby be employed to actuate the electromagnet.

According to another embodiment, the actuation device can be a gas spring that encloses a gas space to which pressure can be applied and which is delimited on the side facing the sealing seat by the sealing element. In this embodiment, the sealing element is joined in a gas-tight manner to the adjacent delimiting walls by a membrane configured like a corrugated diaphragm, and the delimiting walls and the web being configured integrally and continuously with one another. The web can be provided with a bore that is configured as a pressure connection. Through the pressure connection, positive or negative pressure is applied to the gas space as required. It is also possible to hold the sealing element in the open or closed position regardless of the differential pressure at the sealing element.

The actuation device can also, for example, be implemented by means of a linkage that is joined to the sealing element. External generation of the necessary movement and its profile over time, as well as the magnitude of the stroke, can be controlled, for example, mechanically with adjustable eccentrics or cams. An advantage of a mechanical actuation device is that large forces can easily be transferred to the sealing element. Hydraulic triggering, analogous to pneumatic triggering, is also possible.

BRIEF DESCRIPTION OF THE DRAWINGS

Several exemplary embodiments of the intake pipe of an internal combustion engine according to the invention are depicted in the drawings and will be explained in more detail below.

DETAILED DESCRIPTION

Figure 1:
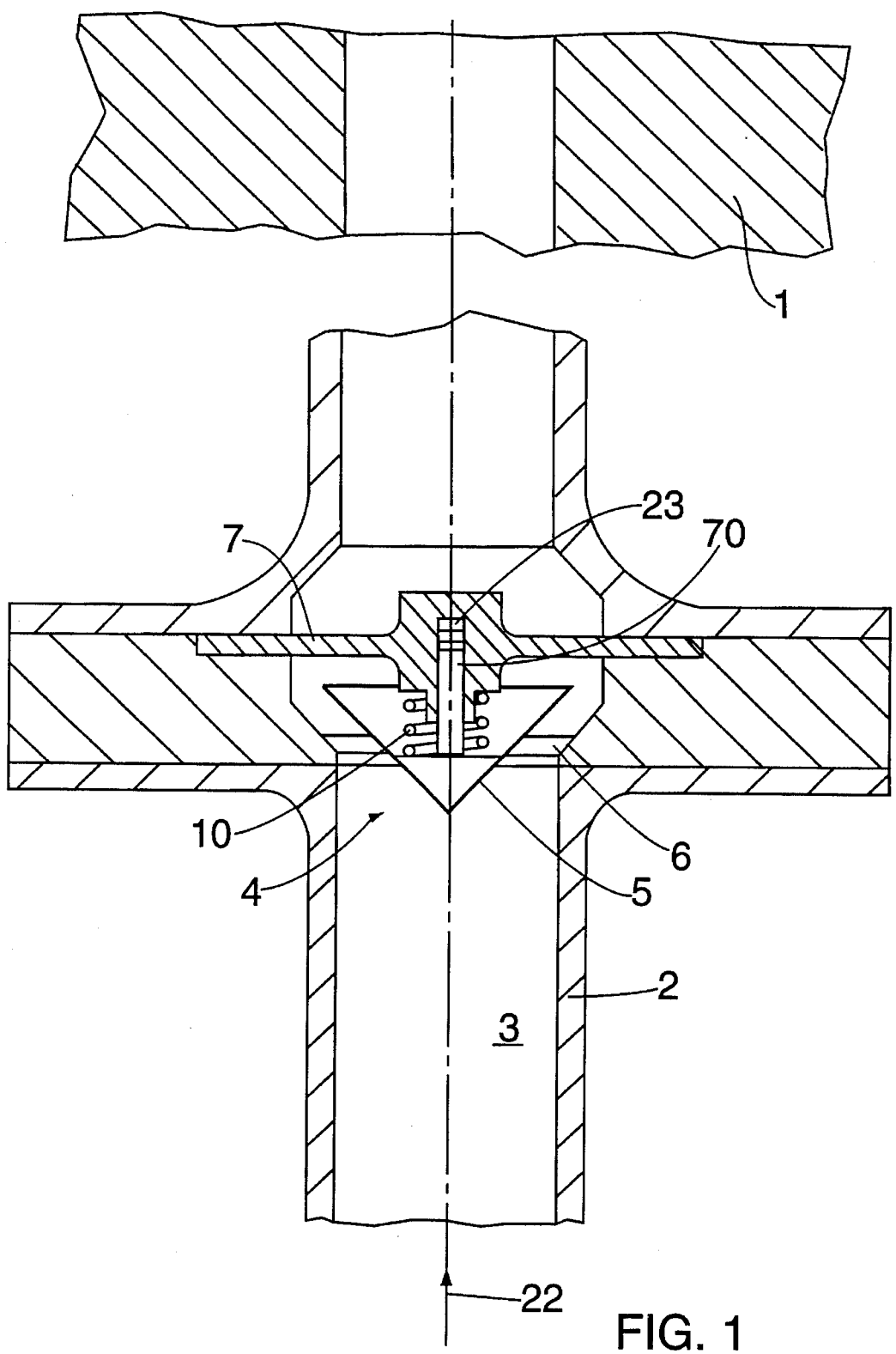
FIG. 1 is a cross-sectional view of a first exemplary embodiment in which the sealing element can be moved only by differential pressure.

FIGS. 1 to 5 each depict an exemplary embodiment which shows a schematically depicted portion of an intake pipe of an internal combustion engine. The intake pipe consists of a dimensionally stable intake pipe body 2 that, in the exemplary embodiments shown here, is made of polymer material. Arranged within passthrough opening 3 of intake pipe body 2 is a nonreturn valve 4, which comprises a sealing element 5 and a sealing seat 6.

Nonreturn valve 4 prevents pulsating gas flows, which result from the piston motion and valve overlap of the internal combustion engine 1, from flowing back into the intake pipe and thereby leading to reductions in the filling of the combustion chambers and a resulting decrease in output. In the desired flow direction 22, sealing element 5 offers a passthrough cross section 3 through intake pipe 2 with a relatively low flow resistance. Sealing element 5 is shaped so as to possess a cross section that expands conically in the flow direction. If gas flows move, as a result of pulsation, against flow direction 22, sealing element 5 and sealing seat 6 are brought into sealing engagement with one another. Passthrough opening 3 through intake pipe body 2 is then closed off.

In the interest of minimizing inertia, sealing elements 5 depicted in these exemplary embodiments are manufactured from light-weight polymeric materials. Sealing seat 6 is made of an elastomeric material that prevents the occurrence of contact noise when it contacts the sealing element, and guarantees reliable sealing over a long service life.

FIG. 1 depicts a first exemplary embodiment, in which sealing element 1 is actuable only by differential pressure across the sealing element. The tapered sealing element 5, which has an internally open form of a shell and is surrounded along its outer periphery, in the region of its guide bolt 70, by a spoke-like web 7. The spokes have a cross section that is tapered in the flow direction 22, which is fluidically advantageous. In this exemplary embodiment, spring element 10 is a helical compression spring, and is supported with preload at a first end on web 7 and at its other end on sealing element 5. The resilience of the helical compression spring is such that at the maximum possible differential pressure which occurs, the guide bolt 70 of the sealing element is in contact with an end stop 23 of web 7. In this exemplary embodiment, end stop 23 consists of a rubber element that additionally performs the function of an end position damper. The guide bolt 70 can, for example, be tubular in shape in order to avoid functional impairments due to an air cushion between the web and the guide bolt. According to another embodiment, the web could be provided, in the axial direction adjoining the receiving bore for the guide bolt, with a bore of relatively reduced diameter to prevent a pressure buildup in this region.

Figure 2:
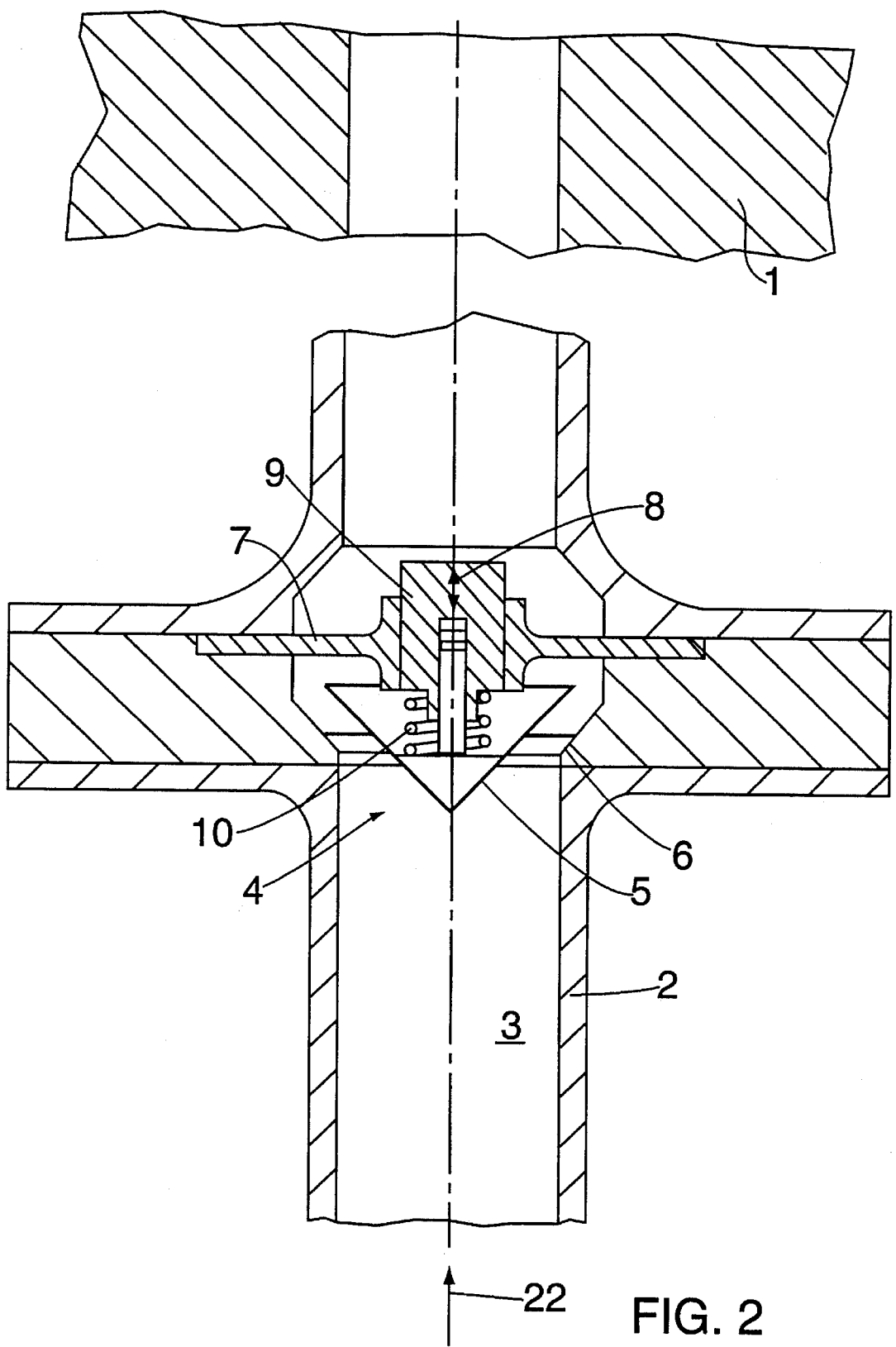
FIG. 2 is a cross-sectional view of a second exemplary embodiment that corresponds substantially to the embodiment from FIG. 1 but which provides that, in addition to being acted on by differential pressure, the movement of the sealing element can be affected by a mechanical actuation device.

FIG. 2 depicts a second exemplary embodiment that is configured similarly to the exemplary embodiment in FIG. 1. As in the embodiment shown in FIG. 1, sealing element 5 is in a center position in which it is actuated at least partly by the gas flow. In addition to throttling of the flowthrough cross section as a function of differential pressure, the intake pipe of FIG. 2 can be closed off or held open completely regardless of the differential pressure at sealing element 5. This is made possible by the fact that sealing element 5 is actuated by an actuation device that can move back and forth in the axial direction 8 relative to sealing seat 6. In this exemplary embodiment, the actuation device consists of a reciprocating element 9 that is displaceably held in web 7. Reciprocating element 9 can be moved by a positioning device (not depicted here), such as a servomotor. The spring force of spring element 10, which in this exemplary embodiment is again configured as a helical compression spring, can be varied by the reciprocating movement of reciprocating element 9. To ensure that the passthrough opening can be reliably sealed, reciprocating element 9 can be moved toward sealing seat 6 until sealing element 5 is engaged therewith; the passthrough cross section remains closed off even at the maximum possible differential pressure. At the maximum stroke in the opposite direction, sealing element 5 can be moved so far away from sealing seat 6 that an open passthrough cross section is guaranteed at all times. A prerequisite for this, however, is that spring element 10 also be able to transfer tensile forces. This is the case, for example, where the helical compression spring is positively connected at one axial end to a snap-in rim of reciprocating element 9, and at its other axial end to a snap-in rim of sealing element 5.

Figure 3:
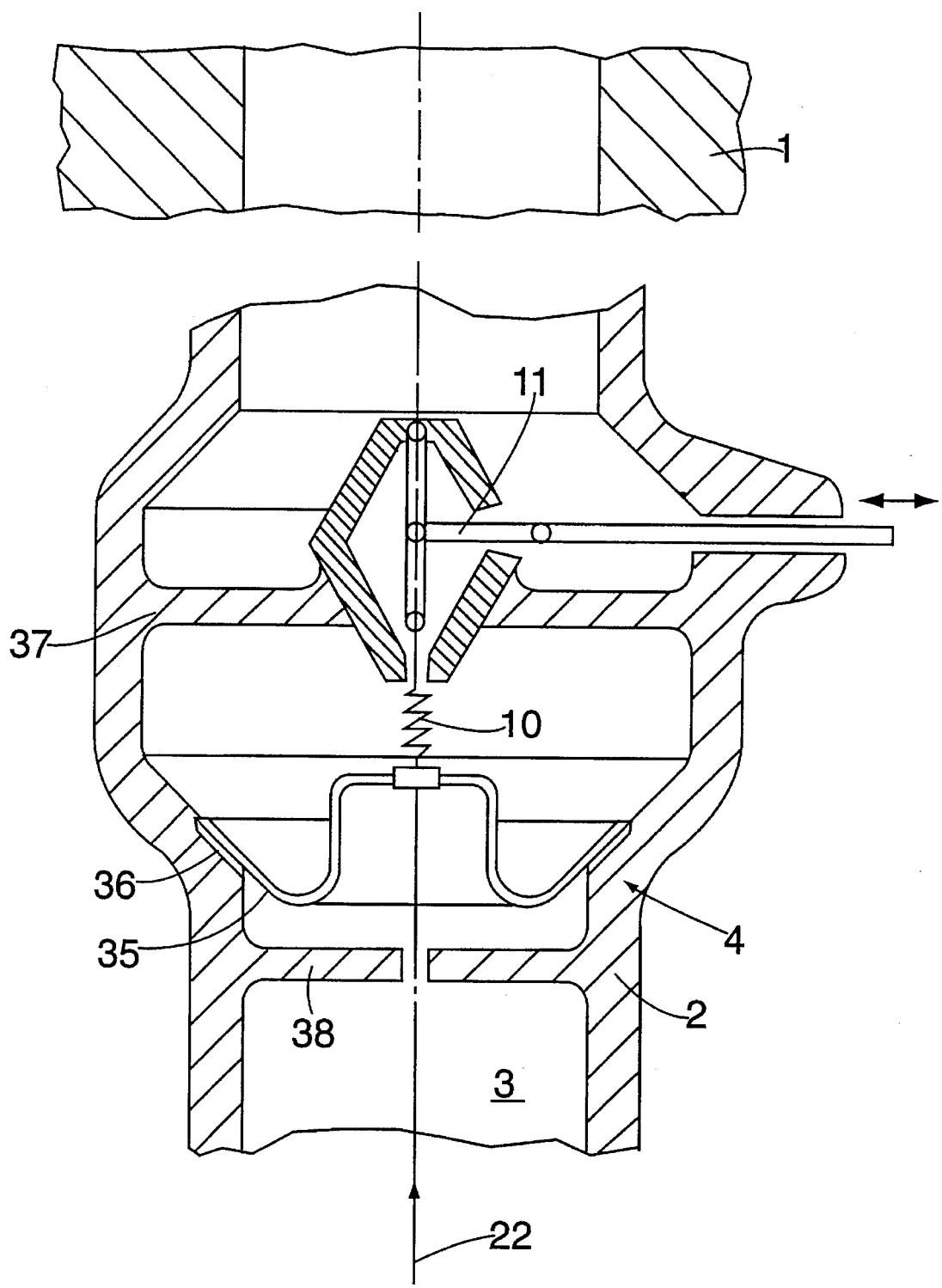
FIG. 3 depicts a third exemplary embodiment, similar to the exemplary embodiment from FIG. 2, in which the actuation device is a mechanically actuated linkage.

FIG. 3 shows an exemplary embodiment that substantially corresponds, in functional terms, to the exemplary embodiment shown in FIG. 2. However, instead of the reciprocating element being actuated by a servomotor, in this exemplary embodiment positioning device 11 can be actuated by a mechanical linkage. The desired adaptation of spring stiffness to the current operating state of the internal combustion engine is achieved by utilizing the linkage to preload the spring to varying degrees. The required movement of the linkage can be generated, for example, with adjustable eccentrics or cams. The stroke length, the timing frequency, and changes in the stroke over time are implemented mechanically. With a suitable design, comparatively large forces can be transferred. As in the example described previously, spring element 10 is appropriately fastened to the linkage at one end and to sealing element 35 at the other end in order to transfer compressive and tensile forces. In contrast to the examples described previously, a further web 38 is provided to help assure the exact guidance of the sealing element 35 with respect to the sealing seat 36. Web 38 is associated with the sealing element on the side facing away from internal combustion engine 1.

With appropriate triggering, this system can also be provided with a direct rigid connection between sealing element 35 and a positioning device 11, instead of spring 10.

Figure 4:
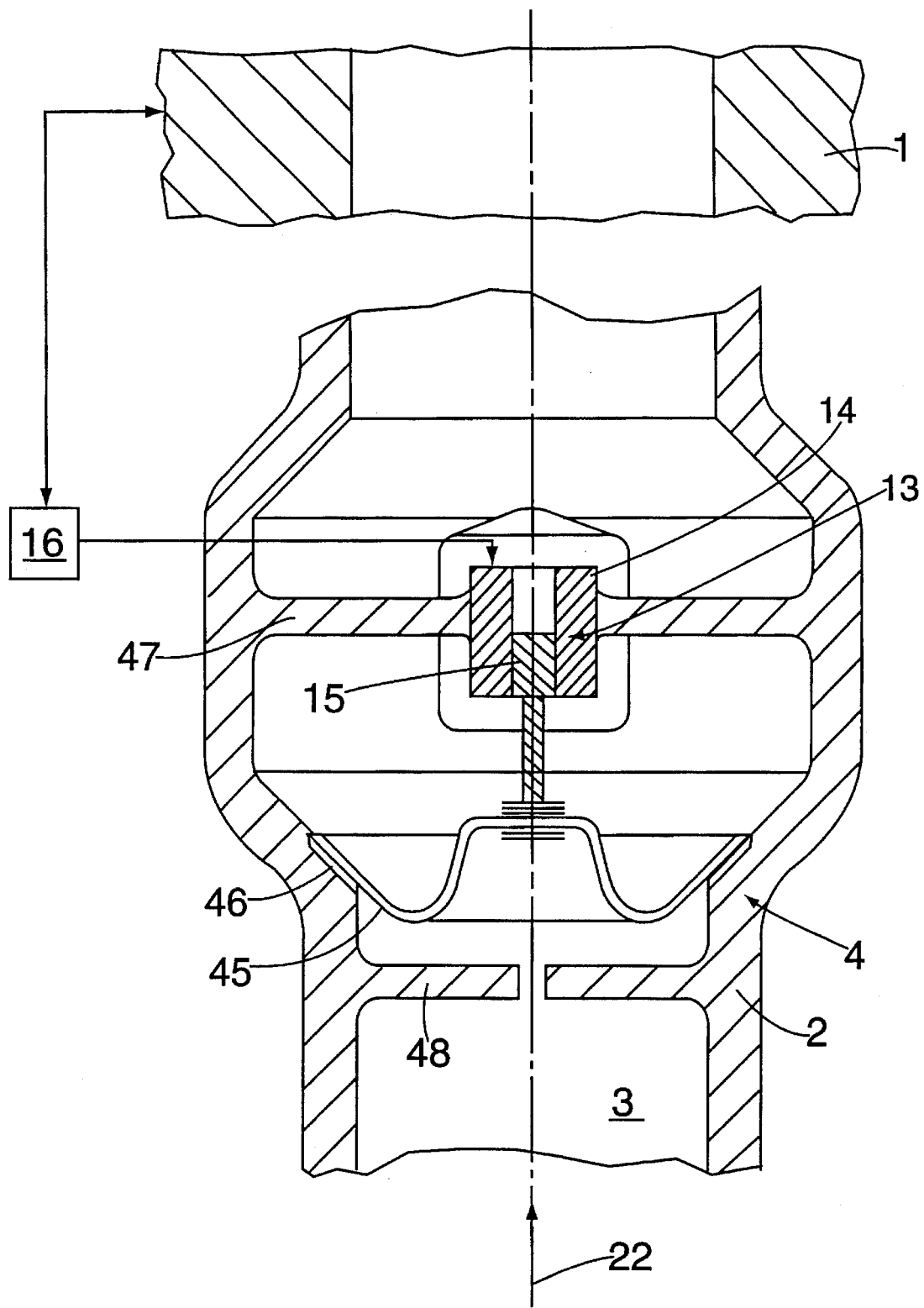
FIG. 4 shows the actuation device as an electromagnet.

FIG. 4 shows a fourth exemplary embodiment that comprises an electromagnet as the actuation device. The performance characteristics of the electromagnet in terms of timing frequency and stroke, must be kept in mind when selecting the electromagnet. Electromagnet 13 comprises a coil 14 surrounding an armature 15 that is rigidly joined to a sealing element 45. For safety reasons, it is provided that sealing element 45 can be brought into the open position only when electromagnet 13 is acted upon by current. A power supply fault then results in an interruption of the air/fuel mixture into the combustion chambers of internal combustion engine 1, causing it to shut down. In this exemplary embodiment sealing element 45 can be actuated exclusively by electromagnet 13, which is connected to a control unit 16 in a signal-carrying manner. In this exemplary embodiment control unit 16 simultaneously constitutes the engine management system. In this embodiment, a further web 48 is provided on the side of sealing element 5 facing away from internal combustion engine 1, to help precisely guide and position sealing element 45 with respect to sealing seat 46.

Figure 5:
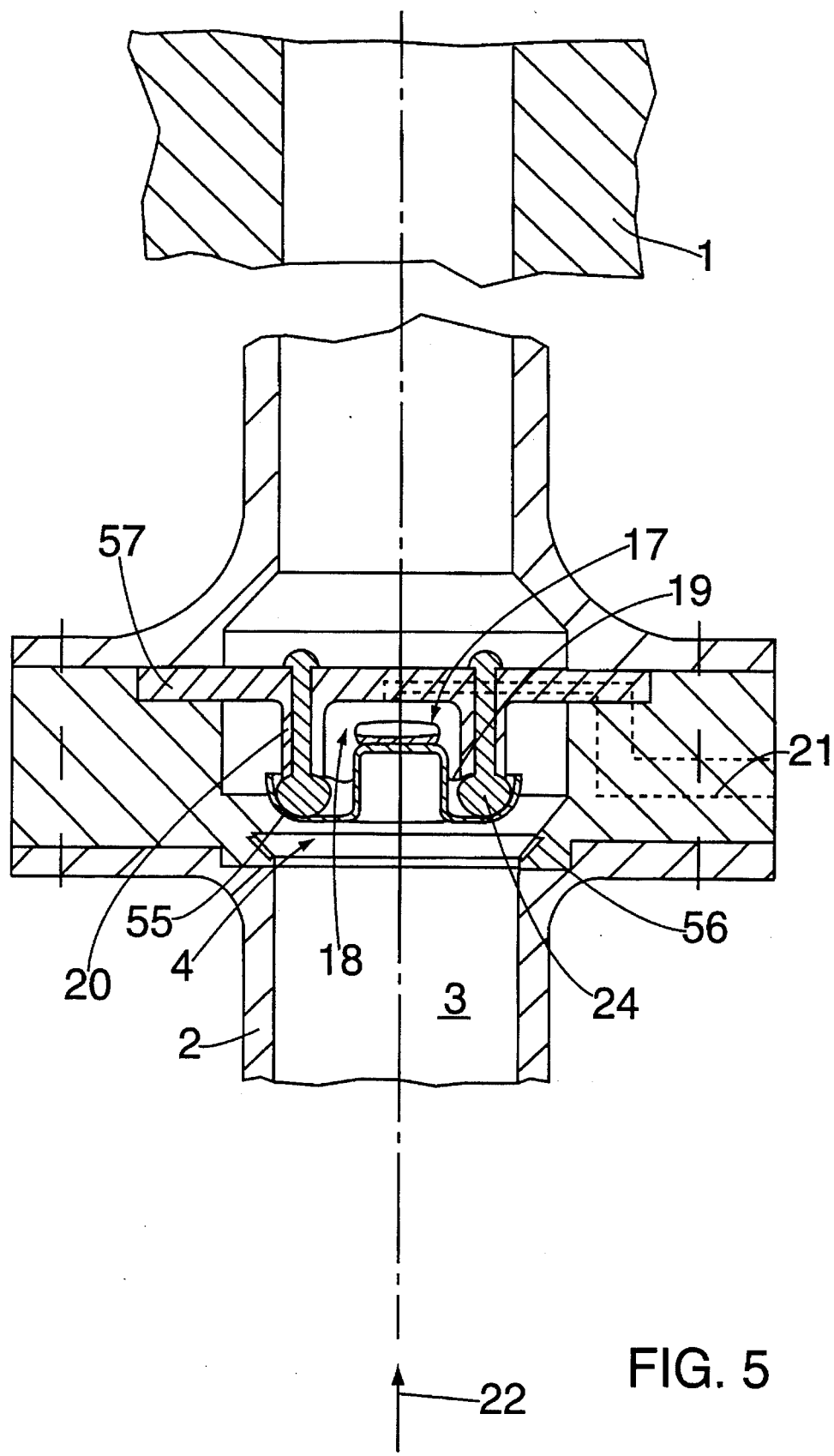
FIG. 5 shows a fifth exemplary embodiment in which the actuation device is a gas spring.

FIG. 5 shows a fifth exemplary embodiment in which, in contrast to the exemplary embodiments described previously, the actuation device is a gas spring 17. Gas spring 17 comprises a gas space 18 to which pressure can be applied and which is delimited by web 57 and by sealing element 55 that is movable with respect thereto, web 57 and sealing element 55 being fastened to one another in a gas-tight manner by means of a membrane 19 which resembles a corrugated diaphragm. Pressure is applied to gas space 18 via a pressure connection 21, which can be a bore passing through web 57. The pressure, and therefore, the spring stiffness of the gas spring, are set by varying the degree of pressure applied to the gas space 18 through the pressure connection 21. The passthrough opening through the intake pipe can be completely opened or completely closed off. When negative pressure is applied, sealing element 5 lifts completely away from sealing seat 56 and rests, as shown here, against stops 24, so that nonreturn valve 4 is held completely in the open position. When a positive pressure of at least 3 bars is applied to gas space 18, sealing element 55 is moved toward sealing seat 56, and brought into sealing engagement therewith even at the maximum pressure difference during operation of the internal combustion engine. Between the two extreme pressures that can be applied to gas space 18, any desired pressure can be set, so that the spring stiffness of the system is variable and can therefore be freely set for any engine operating point. In this exemplary embodiment sealing element 55 is circularly accurate so that good sealing is guaranteed even in the presence of slight radial offsets. With sealing element 55 in intermediate positions between its two stop positions, the force of the gas flow can be used to additionally influence the opening cross section.

What is claimed is:

1. An intake pipe for an internal combustion engine, comprising:

a dimensionally stable intake pipe body having a passthrough opening located therein; and a positioning means arranged in the passthrough opening for changing the available flow cross section of the passthrough opening, said positioning means having a non-return valve openable only in the direction of an internal combustion engine, the nonreturn valve comprising a sealing element that is substantially conical in shape, having a cross section that expands in its opening direction and having the cross-sectional profile of a shell, and a sealing seat which can move relative to one another and which can be selectively brought into engagement with one another to close off the passthrough opening.

2. An intake pipe as set forth in claim 1, wherein the sealing element is actuable by variations in pressure.

3. An intake pipe as set forth in claim 1, wherein the sealing element is made of a polymer material.

4. An intake pipe as set forth in claim 1, further comprising at least one spoke-shaped web extending substantially radially from the intake pipe body into the passthrough opening, and wherein the sealing element is fastened to the web.

5. An intake pipe for use with an internal combustion engine, the intake pipe comprising:

a pipe body having first and second ends and a passthrough opening located in the pipe body; and a valve openable only towards one of the ends of the pipe body, said valve comprising an axially shiftable, conically shaped sealing element having the internally open form of a shell and a sealing seat which can move relative to one another and which can be selectively brought into engagement with one another to close off the passthrough opening.

6. An intake pipe as set forth in claim 5, wherein the sealing element is made of a polymer and is between 0.3 mm and 0.6 mm in thickness.

7. An intake pipe as set forth in claim 6, wherein the thickness of the sealing element is between 0.4 mm and 0.5 mm in thickness.

8. An intake pipe as set forth in claim 5, wherein the sealing element is made of spring steel and is between 0.15 mm and 0.3 mm in thickness.

9. An intake pipe as set forth in claim 8, wherein the thickness of the sealing element is between 0.2 mm and 0.25 mm in thickness.

* * * * *